United States Patent Office 3,225,289
Patented Dec. 21, 1965

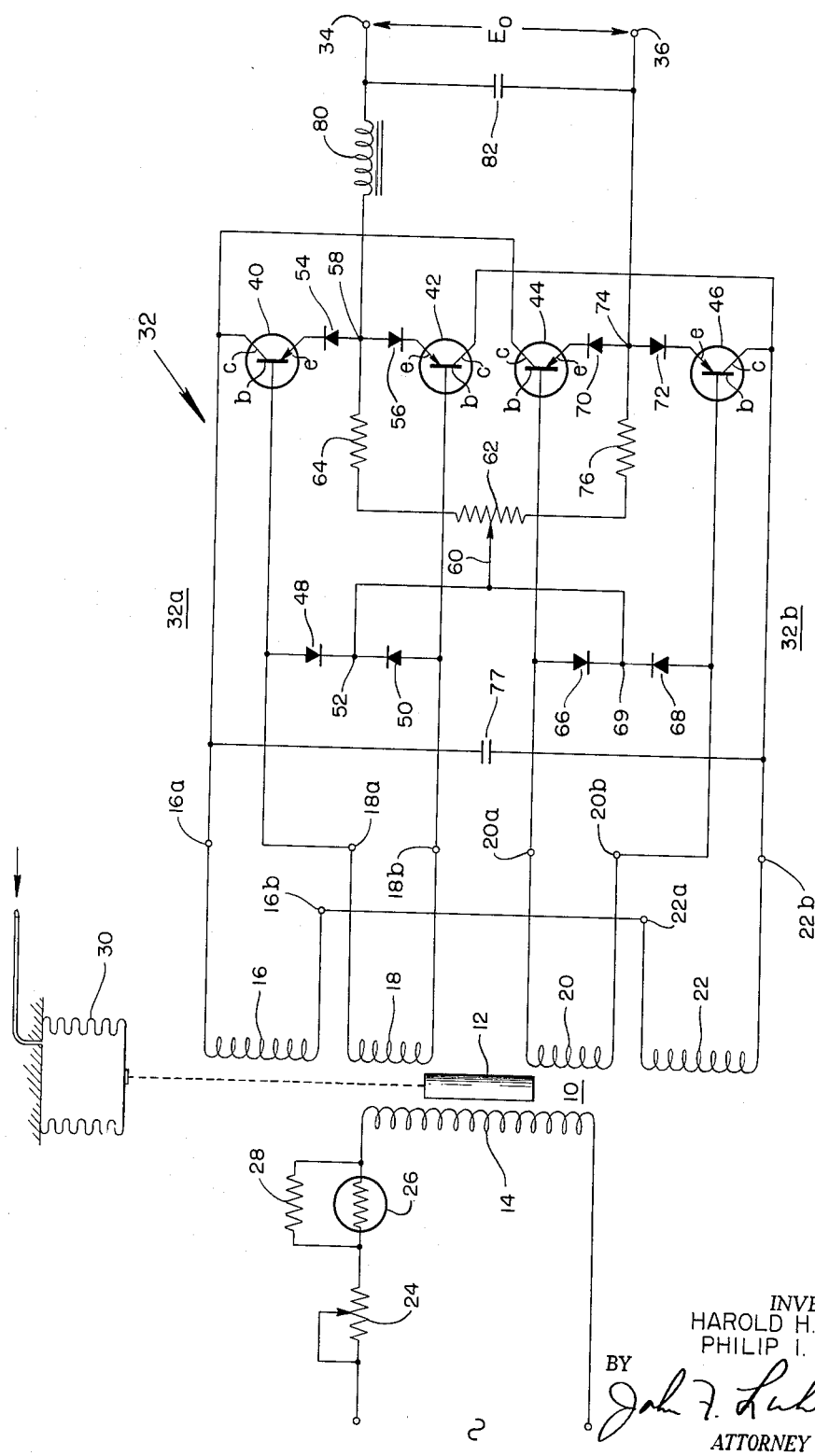

3,225,289
M.C.T. TRANSMITTER
Harold H. Koppel, University Heights, and Philip I. Wajs, Cleveland, Ohio, assignors to Bailey Meter Company, a corporation of Delaware
Filed Sept. 14, 1962, Ser. No. 223,742
10 Claims. (Cl. 323—51)

This invention relates to transmitting devices and more particularly to a transmitter utilizing a movable core transformer for producing an electrical output signal representative of a variable condition.

The movable core transformer has been heretofore employed as a transmitting device to establish an electrical output signal representative of a condition. Such transmitting devices produce an alternating voltage across a secondary winding dependent on the position of the core which establishes an inductive coupling between the primary and secondary windings.

In many electrical instrumentation systems, and particularly those employed in process control, it is desired to use direct voltage signals for transmission between remote locations. Accordingly when a movable core transmitter is used to derive a signal representative of a variable, the alternating signal output is usually converted to a direct voltage signal variable in a desired positive and negative range. In a typical system the direct voltage signal range may be, for example, +10 to −10 volts.

It has been customary to provide a separate A.-C. to D.-C. converter sensitive to the phase and magnitude of the A.-C. secondary voltage to establish a proportional D.-C. output signal variable in the desired signal range. It is a principal object of this invention to provide an integral low-cost movable core transformer and A.-C. to D.-C. converter having improved operational and structural features.

Another object of the invention is to provide a combined movable core transformer and A.-C. to D.-C. converter for establishing a full-wave rectified output signal variable in a predetermined positive and negative signal range.

In the disclosed embodiment of the invention a movable core transformer is provided with a primary winding, a pair of secondary signal windings, and a pair of secondary supply windings. The signal windings establish signal inputs to a pair of full-wave rectifier circuits respectively the output potential difference of which is the direct voltage output signal. Each rectifier circuit comprises a pair of transistors which function as amplifiers during alternate half cycles to establish full-wave rectification in each circuit. In each circuit while one transistor functions as an amplifier, the other functions as a forward biased diode rectifier to complete an amplifier circuit for the amplifying transistor. The secondary supply windings are connected in series adding relationship to establish a net A.-C. bias signal for the two rectifier circuits which is constant over the range of core movement.

Other objects and advantages will become apparent from the following description taken in connection with the accompanying drawing which is a schematic illustration of a transmitting device embodying the invention.

Referring to the drawing there is shown schematically a movable core transformer 10 having a movable core 12, a primary winding 14 and four separate secondary windings 16, 18, 20 and 22. The primary winding 14 is connected across a source of alternating voltage in series with a potentiometer 24 and a temperature compensating circuit comprising a thermistor 26 shunted by a fixed resistance 28. Such temperature compensating circuits function in a manner well known to those skilled in the art to provide a resistance in the primary circuit which varies with ambient temperature to compensate for variations in resistance of the transformer windings with temperature.

The movable core 12 is movable relative to primary winding 14 and secondary windings 16, 18, 20 and 22 to provide a variable inductive coupling between the primary and secondary windings to establish a voltage across each of said secondary windings dependent upon the position of core 12. The core 12 may be positioned by a device responsive to a variable condition such as a pressure sensitive bellows 30 to establish A.-C. voltages across each of the secondary windings proportional to the magnitude of the variable condition.

A rectifier circuit 32 is responsive to the voltages induced in secondary windings 18 and 20 and serves to establish a full-wave rectified output signal across output terminals 34 and 36. The circuit 32 comprises two separate full-wave rectifier sections 32a and 32b. Winding 18 establishes a signal input to section 32a and winding 20 establishes a signal input to section 32b. Windings 16 and 22, as will later be described, are connected in a series adding circuit to establish a net voltage across said circuit which is constant regardless of the position of core 12 to establish a constant magnitude power supply for sections 32a and 32b related in phase to the signal voltages.

The secondary windings 18 and 20 have an equal number of turns and are positioned on opposite sides of the center position of core 12 to function as signal windings to control the operation of transistors 40 and 42 and transistors 44 and 46 respectively, each transistor having a base electrode $b$, an emitter electrode $e$, and a collector electrode $c$. Transistors 40 and 42 are associated with rectifier section 32a and transistors 44 and 46 are associated with rectifier section 32b. Windings 16 and 22 are similarly arranged on opposite sides of the center position of movable core 12 and function as collector supply windings to provide the collector voltages necessary for operation of the transistors. For purpose of describing voltage conditions during operation of the rectifier circuit the upper and lower ends of windings 16, 18, 20 and 22 have been identified by the winding reference numeral followed by the letters $a$ and $b$ respectively.

In the center position of core 12 illustrated, equal voltages will be induced in secondary windings 18 and 20 and in secondary windings 16 and 22. To insure proper collector voltages, as well hereinafter be described, the windings 16 and 22 have a number of turns relative to windings 18 and 20 so as to produce a net constant voltage across the series circuit containing windings 16 and 22 greater in magnitude than the maximum induced voltage in either of windings 18 and 20. If the core 12 is displaced upward the voltages across windings 20 and 22 will proportionally decrease and the voltages across 16 and 18 will proportionally increase. Downward displacement of core 18 will result in the opposite condition.

Referring now specifically to the rectifier section 32a, the base electrodes $b$ of transistors 40 and 42 are connected to end terminals 18a and 18b of signal winding 18. A pair of diode rectifier elements 48 and 50 have their positive terminals connected to the ends 18a and 18b of signal winding 18 and the negative terminals thereof connected to a common junction 52. A second pair of diode rectifier elements 54 and 56 have their negative terminals connected to the emitter electrodes $e$ of transistors 40 and 52 respectively and the positive terminals thereof connected to a common junction 58. The junction 52 of diodes 48 and 50 is connected to a movable contact 60 of a slidewire resistance 62, the upper end of which is connected by a resistance 64 to the junction 58 of diodes 54 and 56. Terminal 16a of winding 16 is connected to the collector electrode c of transistor 40 while terminal 22b of winding 22 is connected to collector electrode c of transistor 42.

In section 32b the base electrodes b of transistors 44 and 46 are connected to end terminals 20a and 20b of signal winding 20. A pair of diode rectifier elements 66 and 68 have the positive terminals thereof connected to end terminals 20a and 20b of winding 20 and the negative terminals thereof connected to a common junction 69. A second pair of diode rectifier elements 70 and 72 have their negative terminals connected to the emitter electrodes e of transistors 44 and 46 and their positive electrodes connected to a common junction 74. The junction 69 is connected to contact 60 while junction 74 is connected by a resistance 76 to the lower end of slide-wire resistance 62. Terminal 22b of secondary winding 22 is connected to the collector electrode c of transistor 46 and terminal 16a is connected to collector electrode c of transistor 44. To complete the circuit terminal 16b is connected to terminal 22a and a capacitor 77 is connected across terminals 16a and 22b to filter out high frequency noise and correct for a slight phase shift between windings 16 and 22.

In the above described circuit the collector bias windings 16 and 22 are connected in series adding relationship to establish an A.-C. collector voltage source for each of the transistors 40, 42, 44 and 46 equal to the sum of the voltages across windings 16 and 22. This collector voltage is independent of the position of the core 12 since the voltage sum is always constant irrespective of individual variations of the winding voltages with displacement of the core 12. Thus, the instantaneous voltage across terminals 16a and 22b will provide the collector voltage for transistors 40, 42, 44 and 46 and will be related in phase to the signal voltages across windings 18 and 20.

Rectifier section 32a functions to establish a full-wave rectified output signal across junctions 52 and 58 of magnitude dependent upon the position of core 12 relative to winding 18. Rectifier section 32b functions to establish a full-wave rectified output signal across junctions 69 and 74 dependent upon the position of core 12 relative to winding 20. Junctions 58 and 74 are connected to output terminals 34 and 36 respectively by means of a filter circuit comprising a coil 80 and capacitor 82 to establish at terminals 34 and 36 a final output signal equal to the potential difference of the outputs of rectifier sections 32a and 32b and variable through a predetermined positive and negative range.

The connection of terminal 16a of winding 16 to collector electrodes c of transistors 40 and 44 and the connection of terminal 22b of winding 22 to the collector electrodes c of transistors 42 and 46 effectively causes the instantaneous collector electrode potential of transistors 40 and 44 to be 180° out of phase with the instantaneous collector electrode potentials of transistors 42 and 46. Thus, in each of the rectifier sections 32a and 32b the two associated transistors will have instantaneous collector voltages of opposite phase to condition the same for transistor amplifier operation during alternate half cycles of the A.-C. source as will hereinafter be described in more detail.

The connection of terminals 18a and 18b of signal winding 18 to the base electrodes b of transistors 40 and 42 respectively serves to apply alternating signal potentials of opposite phase to said base electrodes but in phase with the collector electrode voltages. The arrangement is such that during one half cycle of the A.-C. source when the base electrode of transistor 42 is negative its collector voltage established by windings 16 and 22 will be more negative to render transistor 42 operable as an amplifier. At the same time the base electrode of transistor 42 is negative, the base electrode of transistor 40 will be positive and its collector potential more positive to render transistor 40 operable as a forward biased diode rectifier element to establish circuitry for amplifying operation of transistor 42 which establishes a half-wave signal between junctions 52 and 58. During the next half cycle the polarities will be reversed to render transistor 40 operative as an amplifier and transistor 42 operative as a forward biased diode rectifier element. Thus, in rectifier section 32a the transistors 40 and 42 will alternate in function to establish full-wave rectified signal between terminals 52 and 58 of magnitude dependent upon the position of core 12 relative to signal winding 18. In rectifier section 32b transistors 44 and 46 will similarly alternately operate as an amplifier and forward biased rectifier element to produce a full-wave rectified signal between terminals 69 and 74.

If the movable core 12 is in its center position as indicated on the drawing equal voltages will be induced in windings 18 and 20 and the output potentials of rectifier sections 32a and 32b will be equal resulting in a zero output potential at terminals 34 and 36. If the core 12 should be displaced upward the voltage across winding 18 will increase while the voltage across winding 20 will decrease causing the output potential of rectifier section 32a to exceed the potential of rectifier section 32b to produce a positive output signal equal to the potential difference at terminals 34 and 36. Similarly if the core 12 should be displaced downward the voltage across winding 18 will decrease and the voltage across winding 20 will increase to cause the output potential of section 32b to exceed the output potential of section 32a to result in a negative output signal at terminals 34 and 36.

Referring now to the specific circuit operation of rectifier 32 assume that the movable core 12 is at its center position and that the upper end of primary winding 14 is positive and the lower end thereof negative such as would occur during a positive half cycle of the A.-C. source voltage. The terminals 16a, 18a, 20a and 22a will accordingly be positive and terminals 16b, 18b, 20b and 22b negative. Equal voltages of magnitude dependent on the transformation ratio will be induced in windings 18 and 20 and also in windings 16 and 22. The potential across terminals 16a and 22b will be equal to the sum of the voltages across secondary windings 16 and 20.

Considering first the rectifier section 32a, diode rectifier element 48 will be forward biased by the positive potential at 18a to complete a circuit between terminal 18a and movable contact 60. Diode element 50 will be reverse biased by the negative potential of terminal 18b and nonconductive. Diode element 56 will be biased conductive through the circuit established by diode element 48 while diode element 54 will be reverse biased by said circuit to render the emitter e of transistor 40 open circuited. Since the voltage across terminals 16a and 22b is always greater than the maximum induced voltage across each of windings 18 and 20, the positive potential of terminal 16a will be larger in magnitude than the positive potential of terminal 18a causing the collector electrode c of transistor 40 to be more positive than the base electrode b. As a result the transistor 40, the emitter e of which is open circuited, will function as a forward biased diode rectifier element to establish a circuit from terminal 16a through the collector-base junction of transistor 40 and diode rectifier 48 to junction 52.

The following circuits are now established which render transistor 42 operative as a current amplifier having a common collector configuration. A first circuit for collector current is established from terminal 16a through the collector-base junction of transistor 40, diode element 48, junction 52, contact 60, upper half of slidewire resistance 62, resistance 64, junction 58, diode rectifier element 56, and emitter and collector electrodes of transistor 42 to terminal 22b of winding 22. A circuit for base electrode current is established from terminal 18a through diode rectifier 48, junction 52, contact 60, upper half of resistance 62, resistance 64, junction 58, diode rectifier element 56, emitter-base junction of transistor 42 to terminal 18b. The collector electrode c of transistor 42 is biased negative relative to contact 60 by the negative potential of terminal 22b while base electrode b is biased negative relative to contact 60 by the potential of terminal 18b. Since the potential of terminal 22b is more negative than the potential of terminal 18b the collector electrode is more negative than the base electrode and transistor amplifier operation of transistor 42 will occur. The common collector circuit configuration of the transistor 42 thus established has a voltage gain near unity and the positive half cycle voltage across winding 18 will appear between junctions 52 and 58 with substantial current amplification.

During the same positive half cycle rectifier section 32b functions in a similar manner to effect amplifying operation of transistor 46. In this circuit diode rectifier element 66 will be forward biased by the positive potential at terminal 20a to complete a circuit between terminal 20a and contact 60. Diode rectifier element 68 will be reverse biased by the negative potential of terminal 20b. Diode element 72 will be forward biased by means of the circuit established by diode element 66 while diode element 70 will be reverse biased by said circuit to render the emitter e of transistor 44 open circuited. Collector c of transistor 44 in this circuit is biased by the positive potential of terminal 16a and thus is more positive than emitter e biased by the smaller positive potential of terminal 20a. Transistor 44 thus functions similar to transistor 40 as a forward-biased diode rectifier to establish a circuit from terminal 16a through the collector base junction of transistor 44, diode element 66 and junction 59 to contact 60.

The following circuits are thus established in rectifier section 32b during the positive half cycle to render transistor 46 operative as a current amplifier having a common collector configuration. A first circuit for collector current is established from terminal 16a through the collector-base junction of transistor 44, diode element 66, junction 69, contact 60, lower half of resistance 62, resistance 76, junction 74, diode element 72, and emitter collector electrodes of transistor 46 to terminal 22b of winding 22. A second circuit for base electrode current is established from terminal 20a through diode rectifier element 66, junction 69, contact 60, lower half of resistance 62, resistance 76, junction 74, diode element 72, emitter-base junction of transistor 46 to terminal 20b. Similar to transistor 40 in section 32a the collector and base electrodes of transistor 44 are biased more negative than the emitter electrode which is at the potential of contact 60, the collector electrode being more negative than the base electrode to establish transistor amplifier operation. The common collector circuit configuration of transistor 46 thus also establishes an output half cycle potential between junctions 69 and 74 having a magnitude dependent on the position of core 12 relative to winding 20.

The positive half cycle output of rectifier section 32a between junctions 52 and 58, and rectifier section 32b between junctions 69 and 74 are thus in phase and each dependent on the signal voltages across windings 18 and 20 respectively. Accordingly the half cycle output at terminals 34 and 36 will be equal to the signal difference. If the movable core 12 is at its center position as previously assumed the signal difference will be zero. If the core 12 is displaced from its center position the output potential at terminals 34 and 36 will be positive or negative depending on the direction of displacement.

During the following negative half cycle of the A.-C. source voltage the functions of the transistors in each rectifier circuit will reverse to effect full-wave rectification. During the negative half cycle the upper end of primary winding 14 will be negative and the lower end positive. Accordingly, terminals 16a, 18a, 20a and 22a will be negative and terminals 16b, 18b, 20b and 22b positive.

Considering first rectifier section 32a during the negative half cycle, diode rectifier element 50 will be forward biased by the positive potential at terminal 18b to complete a circuit between terminal 18b and contact 60. Diode rectifier element 48 will be reverse biased by the negative potential at terminal 18a and non-conductive. Diode element 54 will be forward biased by means of the circuit established by diode element 50 to establish a circuit for emitter e of transistor 40. Diode element 56 will be accordingly biased non-conductive to open circuit the emitter e of transistor 42. The collector electrode c of transistor 42 will be positively biased by the potential of terminal 22b and will be more positive than the base electrode b biased by the positive potential of terminal 18b. The collector-base junction of transistor 42 will accordingly function as a forward biased diode rectifier to establish a circuit from terminal 22b through said collector-base junction and diode element 50 to junction 52.

During the negative half cycle the following circuits are thus established in rectifier section 32a to render transistor 40 operative as a transistor amplifier having a common collector configuration. A first circuit for collector current is established from terminal 22b through the collector-base junction of transistor 42, diode element 50, junction 52, contact 60, upper half of resistance 62, resistance 64, junction 58, diode element 54, and emitter collector electrode of transistor 40 to terminal 16a. A second circuit for base electrode current is established from terminal 18b through diode element 50, junction 52, contact 60, upper half of resistance 62, resistance 64, diode element 54, emitter-base junction of transistor 40 to terminal 18a. Accordingly, transistor 40 will have the same bias and circuit conditions as transistor 42 during the previous half cycle and be operative to establish an output half-wave signal between junctions 52 and 58, the voltage magnitude depending on the position of core 12 relative to winding 18.

Rectifier section 32b functions similarly during the negative half cycle to effect amplifier operation of transistor 44. In this circuit diode elements 68 and 70 are forward biased and diodes 66 and 72 are reverse biased and nonconductive. Emitter e of transistor 46 is open circuited while the collector-base junction of transistor 46 is biased to render the same operative as a forward biased diode rectifier element. Accordingly the following circuits are established for amplifying operation of transistor 44. A circuit for collector current is established from terminal 22b through the collector-base junction of transistor 46, diode element 68, junction 69, contact 60, lower half of resistance 62, resistance 76, junction 74, diode element 70, and emitter-collector electrodes of transistor 44 to terminal 16a. A circuit for base electrode current is established from terminal 20b through diode element 68, junction 69, contact 60, lower half of slidewire resistance 62, resistance 76, junction 74, diode element 70, emitter-base junction of transistor 44 to terminal 20a. Transistor 44 thus functions to produce a half-wave signal between junctions 69 and 74 during the negative half cycle, the magnitude of which is dependent on position of core 18.

The rectifier sections 32a and 32b thus function to effect a full-wave rectification of the alternating voltages induced in signal windings 18 and 20 respectively. The two full-wave rectified signals are compared to establish an output potential at terminals 34 and 36 variable in a predetermined positive and negative range representative of the position of core 12 relative to its center position. The collector voltages for transistors 40, 42, 44 and 46 are established by windings 16 and 22 which uniquely provide a source of constant collector voltage related in phase to the signal voltages induced in windings 18 and 20. This feature coupled with the alternate functioning of the transistors as a common collector amplifier and forward biased diode rectifier achieves considerable circuit simplicity.

The common collector circuit configuration of the transistors 40, 42, 44 and 46 during amplifying operation thereof advantageously results in a low output impedance which is desirable when the transmitting device is employed in an instrumentation system where isolation between components is desired by impedance transformation.

The potentiometer 24 provides a means for adjusting the voltage across primary winding 14 to determine the magnitude of the output potential for a predetermined displacement of core 12. One suitable output signal range, for example, would be a +10 to −10 volts.

Contact arm 60 is preferably adjusted during calibration of the device to set the output potential to zero in the center position of the core 12. In effect contact arm 60 is adjusted to balance differences in resistance, transistor and diode characteristics.

While the invention is not limited in scope to the particular circuitry described, for purpose of disclosure the following is a tabulation of suitable component values for the embodiment shown on the drawing:

| Component: | Value |
| --- | --- |
| Transistor 40 | Type 2N1188. |
| Transistor 42 | Type 2N1188. |
| Transistor 44 | Type 2N1188. |
| Transistor 46 | Type 2N1188. |
| Potentiometer 24 | 500 ohms, 12.5 watts. |
| Potentiometer 60 | 2K, 0.25 watt. |
| Themistor 26 | 415 ohms. |
| Resistance 28 | 220 ohms, 10 watts. |
| Resistance 64 | 4K, 5 watts. |
| Resistance 76 | 4K, 5 watts. |
| Diode 48 | Type 1N538. |
| Diode 50 | Type 1N538. |
| Diode 54 | Type 1N538. |
| Diode 56 | Type 1N538. |
| Diode 66 | Type 1N538. |
| Diode 68 | Type 1N538. |
| Diode 70 | Type 1N538. |
| Diode 72 | Type 1N538. |
| Capacitance 82 | 10 mfd., 150 volts. |
| Capacitance 77 | 0.02 mfd., 400 volts. |
| Choke 80 | 23 ohms, 13 H. |
| Winding 14 | 8000 turns. |
| Windings 16 and 22 | 5000 turns each. |
| Windings 18 and 20 | 6100 turns each. |
| Movable core 12 | 0.265 inch stroke. |

While only one embodiment of the invention has been herein shown and described, it will be apparent to those skilled in the art that many changes may be made in the construction and arrangement of parts without departing from the scope of the invention as defined in the appended claims.

It is claimed and desired to secure by Letters Patent of the United States:

1. In a transmitting device the combination comprising; a transformer having a movable core adapted to be displaced relative to a center position, a primary winding coupled to a source of alternating voltage, and a pair of secondary windings, said movable core being operative to establish a variable inductive coupling between said primary winding and each of said secondary windings to establish an alternating signal across each of said secondary windings of magnitude dependent on the position of said core; a pair of rectifier circuits coupled to said secondary windings respectively, each of said rectifier circuits having rectified output signal proportional to the position of said core with respect to its associated secondary winding; a pair of transistors in each of said rectifier circuits having input electrodes connected to the ends of the associated secondary winding; circuit means in each of said rectifier circuits for establishing amplifier operation of one transistor of each pair during alternate half cycles to produce full-wave rectification in each of said rectifier circuits; and an output circuit for comparing the output signals of said rectifier circuits to produce a full-wave rectified output signal variable in a predetermined positive and negative range dependent on the position of said core with respect to said center position.

2. In a transmitting device the combination comprising; a transformer having a movable core adapted to be displaced relative to a center position, a primary winding coupled to a source of alternating voltage, a pair of secondary signal windings positioned on opposite sides of said center position, a pair of secondary supply windings positioned on opposite sides of said center position and connected in a series adding circuit, said core being operative to establish a variable inductive coupling between said primary winding and each of said secondary windings to establish an alternating signal across each of said secondary signal windings of magnitude dependent upon position of said core and a potential across said series circuit of constant magnitude irrespective of the position of said core; a pair of full-wave rectifier circuits coupled to said secondary signal windings respectively for producing full-wave rectified signals proportional to the position of said core relative to said signal windings respectively; and second means connecting the ends of said series adding circuit to said rectifier circuits respectively to establish a self compensated power supply for said transmitter.

3. In a transmitting device the combination comprising; a transformer having a movable core adapted to be displaced relative to a center position, a primary winding coupled to a source of alternating voltage, and a pair of secondary windings positioned on opposite sides on said center position, said movable core being operative to establish a variable inductive coupling between said primary and each of said secondary windings to establish an alternating voltage across each of said secondary windings of magnitude dependent on the position of said core; a pair of rectifier circuits coupled to said secondary windings respectively each having an output voltage proportional to the position of said core with respect to the associated secondary winding; a pair of transistors in each of said rectifier circuits have input electrodes connected to the ends of the associated secondary windings; circuit means in each of said rectifier circuits connected to said transistors for establishing amplifier operation of one transistor of each pair during alternate half cycles and for rendering the second transistor of said pairs operative as a conductive circuit element when the other is operating as an amplifier to produce full-wave rectification in each of said rectifier circuits; and an output circuit connected to said rectifier circuits for comparing their output voltages to produce a full-wave rectified output voltage variable in a predetermined positive and negative range.

4. In a transmitting device, the combination comprising; a transformer having a movable core adapted to be displaced relative to a center position, a primary winding coupled to a source of alternating voltage, a pair of secondary signal windings disposed on opposite sides of said center position, a pair of secondary power supply windings disposed on opposite sides of said center position and connected in a series circuit in an aiding relationiship; a first rectifier circuit comprising a first pair of transistors having collector electrodes respectively connected to opposite ends of said series circuit, base electrodes respectively connected to opposite ends of one of said signal windings, and emitter electrodes respectively; a second rectifier circuit comprising a second pair of transistors having collector electrodes respectively connected to opposite ends of said series circuit, base electrodes respectively connected to opposite ends of the other of said signal windings and emitter electrodes respectively; a first pair of diode rectifier elements having the positive terminals thereof connected to opposite ends respectively of one signal winding and the negative terminals thereof connected to a first common junction; a second pair of diode rectifier elements also having their positive terminals connected to opposite ends respectively of said other signal winding and their negative terminals connected to a second common junction; a third pair of diode rectifier elements having the negative terminals thereof connected to said emitter electrodes of said first pair of transistors respectively and the positive electrodes thereof connected to a third common junction; a fourth pair of diode rectifier elements having the negative terminals thereof connected to said emitter electrodes of said second pair of transistors respectively and the positive electrodes thereof connected to a fourth common junction; a slidewire resistance having the ends thereof connected to said third and fourth junctions respectively and having a movable contact arm connected to said first and second junctions, a pair of output terminals; and a filter circuit connecting said third and fourth junctions to said output terminals to establish a smooth direct voltage output at the same equal to the potential difference of the potentials between said third junction and said contact arm and the potential between said fourth junction and said contact arm.

5. In a transmitting device as claimed in claim 4 wherein a pair of emitter resistances connect the ends of said slidewire resistance to said third and fourth junctions respectively.

6. In a transmitting device as claimed in claim 5 wherein a capacitor is connected across said series circuit comprising said supply windings.

7. In a transmitting device as claimed in claim 5 wherein an adjustable potentiometer is connected in series with said primary winding across the alternating voltage source.

8. In a transmitting device the combination comprising; a transformer having a movable core adapted to be displaced relative to a center positon, a primary winding coupled to a source of alternating voltage, and a secondary signal winding having an induced voltage proportional to the position of said core relative thereto, a pair of transistors each having collector, base and emitter electrodes; a circuit connecting said base electrodes to the ends of said signal winding respectively to apply alternating potentials thereto opposite in phase; a supply circuit for said collector electrodes for applying an alternating signal to each of said collector electrodes in phase with the associated base electrode potential and of greater magnitude; a first pair of diode rectifier elements having the positive terminals thereof connected to opposite ends respectively of said signal winding and the negative terminals thereof connected to a first common junction; a second pair of diode rectifier elements having the negative terminals thereof connected to said emitter electrodes of said transistors respectively and the positive electrodes thereof connected to a second common junction; a resistance connecting said first and second junctions, said transistors alternately functioning as common collector amplifiers and as forward biased rectifiers during successive half cycles of the alternating voltage source to establish a full-wave rectified potential between said first and second junctions proportional to the position of said core relative to said signal winding.

9. In a transmitting device the combination comprising, a transformer having a movable core adapted to be displaced relative to a center position; a primary winding coupled to a source of alternating voltage, and a secondary signal winding having an induced voltage proportional to the position of said core relative to said secondary winding; a pair of transistors each having collector, base and emitter electrodes, a circuit connecting said base electrodes to the ends of said signal winding respectively to apply alternating potentials thereto of opposite phase; an alternating voltage source for said collector electrodes for applying an alternating bias signal to each collector electrode in phase with and of greater magnitude than the associated base electrode signal; and a diode rectifier circuit having a pair of output terminals and connected to the base electrodes and emitter electrodes of, said transistors to effect alternate operation thereof as common collector amplifiers and as forward bias rectifiers during successive half cycles of the alternating voltage source thereby establishing a full-wave rectified potential at its output terminals proportional to the position of said core relative to said signal winding.

10. In a transmitting device the combination comprising; a transformer having a movable core adapted to be displaced relative to a center position, a primary winding coupled to a source of alternating voltage, a secondary signal winding positioned on one side of said center position and having an induced voltage proportional to the displacement of said core with respect to said center position, and a pair of secondary power supply windings positioned on opposite sides of said center position and connected in a series adding circuit to produce a net induced voltage across said series circuit which is constant irrespective of the position of said core and greater in magnitude than the maximum induced voltage across said signal winding; a pair of transistors each having collector, base and emitter electrodes; a circuit connecting said base electrodes to the ends of said signal winding respectively to apply alternating potentials thereto of opposite phase, a circuit connecting the ends of said series circuit containing said supply windings to said collector electrodes respectively to apply an alternating signal to each collector electrode in phase with the associated base electrode potential; a first pair of diode rectifier elements having the positive terminals thereof connected to opposite ends respectively of said signal winding and the negative terminals thereof connected to a first common junction; a second pair of diode rectifier elements having the negative terminals thereof connected to said emitter electrodes of said transistors respectively and the positive electrodes thereof connected to a second common junction; and a resistance connecting said first and second junctions, said transistors alternating functioning as common collector amplifiers and forward biased rectifiers during successive half cycles of the alternating voltage source to establish a full-wave rectified potential between first and second junctions proportional to the position of said core relative to said signal winding.

References Cited by the Applicant

UNITED STATES PATENTS

| | | | |
|---|---|---|---|
| 2,434,547 | 1/1948 | Browne | 324—34 |
| 2,478,363 | 8/1949 | Boosey | 340—199 |
| 2,631,272 | 3/1953 | Smith | 340—199 |
| 2,827,604 | 3/1958 | Cloud | 318—31 |
| 3,002,144 | 9/1961 | Benton | 323—16 |
| 3,045,174 | 7/1962 | Lafuze | 323—89 |
| 3,046,535 | 7/1962 | Philbin et al. | 340—199 |
| 3,100,889 | 8/1963 | Cannon | 340—199 X |

LLOYD McCOLLUM, *Primary Examiner.*

ROBERT L. SIMS, *Examiner.*